United States Patent Office 3,363,012
Patented Jan. 9, 1968

3,363,012
NOVEL CYCLOPROPANE DERIVATIVES FROM
1,2-BIS(3-CYCLOHEXEN-1-YL)ETHYLENES
John R. Norell, Bartlesville, Okla., assignor to Phillips
Petroleum Company, a corporation of Delaware
No Drawing. Filed Nov. 5, 1965, Ser. No. 506,611
5 Claims. (Cl. 260—648)

ABSTRACT OF THE DISCLOSURE 1,2-bis(3-cyclohexen-1-yl)ethylenes are reacted with carbenes to produce cyclopropyl derivatives with utility as high energy fuels and with halocarbenes to produce cyclopropyl derivatives with utility as insecticides and herbicides.

This invention relates to the preparation of cyclopropane derivatives from 1,2-bis(3-cyclohexen-1-yl)ethylenes. In another aspect it relates to the preparation of substituted cyclopropanes from 1,2-bis(3-cyclohexen-1-yl)ethylenes. In still another aspect it relates to novel substituted cyclopropanes from 1,2-bis(3-cyclohexen-1-yl) ethylenes.

In accordance with this invention, at least one compound selected from the group consisting of substituted cyclopropanes having the formulas

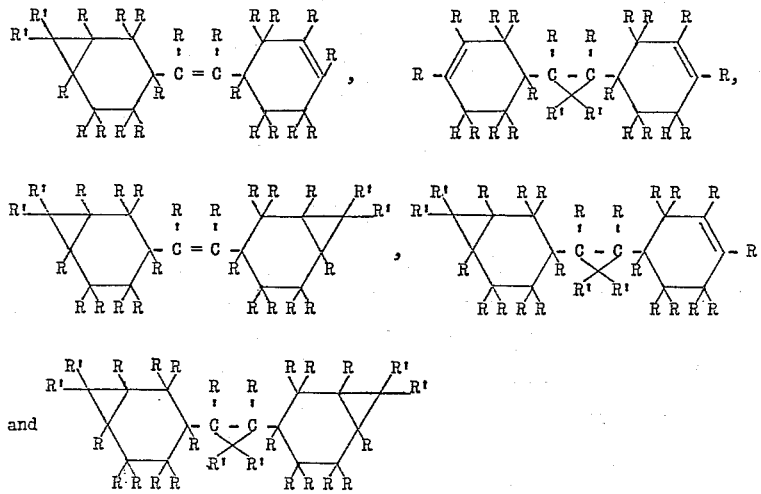

and

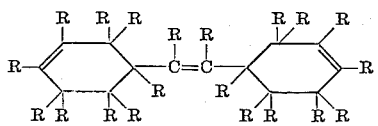

is prepared by the reaction of a carbene having the formula $:CR'_2$ with a triolefin having the formula where R is selected from the group consisting of hydrogen, methyl and ethyl, the total number of carbon atoms in all of said R groups being not greater than 8; and R' is at least one member selected from the group consisting of hydrogen, fluorine, chlorine, and bromine.

Specific examples of triolefins useful in the practice of this invention are as follows:

1,2-bis(3-cyclohexen-1-yl)ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2-bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene
1-(3-cyclohexen-1-yl)-2-(2-methyl-3-cyclohexen-1-yl) ethylene The term "carbene" bears the same relationship to "methylene" as does the term "carbinol" to "methanol" and is to be employed in the same way as "carbinol." The carbenes which are employed in the process of this invention can be prepared by any of a variety of known methods. For example, unsubstituted carbene can be obtained by the photochemical decomposition of diazomethane, and monohalocarbenes can be prepared by the reaction of alkyllithium compounds with methylene halides. Dihalocarbenes are conveniently prepared by methods such as the reaction of alkali metal alkoxides with haloforms or alkyl trihaloacetates, or by thermal decomposition of salts of trihaloacetic acids. The carbene is formed in situ by decomposition of the carbene precursor in the presence of the triolefin. A number of other methods whereby carbenes can be produced for use in this invention are to be found in review articles by Chinoporos, Chemical Reviews, 63, 235 (1963), and Parham and Schweizer, Organic Reactions, 13, 55 (1963).

The triolefins useful in the practice of this invention are prepared and described in a copending application of D. L. Crain (Ser. No. 502,544) assigned to a common assignee, Phillips Petroleum Company of Bartlesville, Okla.

The ratio of carbene precursor to triolefin can vary over a considerable range, depending in part on whether the product most desired contains one, two, or three cyclopropane rings. Thus, if the product most desired is that having only one cyclopropane ring per molecule, the carbene precursor will generally be used in an amount sufficient to produce about 0.02–1 mol of carbene per mol of triolefin employed, the carbene precursor usually being employed in an amount sufficient to produce about 0.1–0.8 mol of the carbene per mol of triolefin used. When the product most desired is that having two cyclopropane rings per molecule, the mol ratio of carbene to triolefin should be within the range of about 1.5:1 to about 2.5:1, preferably being about 2:1. When the product most desired is that having three cyclopropane rings per molecule, the mol ratio of carbene to triolefin should be within the range of about 3:1 to about 4:1. In the preparation of the products containing two or three cyclopropane rings per molecule, it is sometimes advantageous to first prepare and isolate the product having only one cyclopropane ring per molecule and then allow this product to react with an additional quantity of carbene. If desired, the product containing two cyclopropane rings per molecule can be prepared and isolated, and the resulting product similarly treated with an additional quantity of the carbene to give the product having three cyclopropane rings per molecule.

Although the reaction of the carbene with the triolefin can be carried out over a rather broad temperature range, the temperature will generally be within the range of about −40° C. to about 150° C., usually being within the range of about 0° C. to about 40° C. except in those instances in which higher temperatures are required to effect carbene formation. When the carbene is produced in situ by thermal decomposition of the carbene precursor, it is sometimes advantageous to use temperatures up to about 150° C. or higher. The desired reaction time also varies considerably, depending on such factors as the temperature used and the carbene precursor and triolefin employed, but will generally be within the range of about 10 minutes to about 36 hours, usually being within the range of about 30 minutes to about 20 hours.

If desired, a solvent can be employed, the solvent being one which does not react with either the reactants or products. Examples of some suitable solvents are ethers such as ethyl ether, 1,2-dimethoxyethane, dioxane, and the like, and saturated hydrocarbons such as hexane, octane, cyclohexane, and the like. The pressure need be only sufficient to maintain the reactants and/or solvent substantially in the liquid phase. The products are conceniently separated from the reaction mixture by distillation or other suitable means, usually following prior treatment such as hydrolysis, filtration, extraction, or the like.

Specific examples of novel substituted cyclopropanes produced according to this invention are as follows:

1-(3-cyclohexen-1-yl)-2-(3-norcaryl)ethylene
1,2-bis(3-cyclohexen-1-yl)cyclopropane
1,2-bis(3-norcaryl)ethylene
1-(3-cyclohexen-1-yl)-2-(3-norcaryl)cyclopropane
1,2-bis(3-norcaryl)cyclopropane
1-(3-cyclohexen-1-yl)-2-(7,7-difluoro-3-norcaryl)ethylene
1-(3-cyclohexen-1-yl)-2-(7,7-dichloro-3-norcaryl)ethylene
1,1-dichloro-2-bis(3-cyclohexen-1-yl)cyclopropane
1,2-bis(7,7-dichloro-3-norcaryl)ethylene
1,1-dichloro-2-(3-cyclohexen-1-yl)-3-(7,7-dichloro-3-norcaryl)cyclopropane
1,1-dichloro-2,3-bis(7,7-dichloro-3-norcaryl)cyclopropane
1,2-bis(7,7-dibromo-3-norcaryl)ethylene
1-(3-cyclohexen-1-yl)-2-(7-fluoro-7-chloro-3-norcaryl)ethylene
1-chloro-2,3-bis(7-chloro-3-norcaryl)cyclopropane
1,1-difluoro-2,3-bis(1-methyl-7,7-difluoro-3-norcaryl)cyclopropane
1,1-dibromo-2-(2-ethyl-3-cyclohexen-1-yl)-3-(2-ethyl-7,7-dibromo-3-norcaryl)cyclopropane
3,4-bis(6-methyl-7,7-dichloro-3-norcaryl)-3-hexene
1,1-difluoro-2,3-bis(5,5-diethyl-3-cyclohexen-1-yl)cyclopropane
1-(6-methyl-3-cyclohexen-1-yl)-2-(4-methyl-7-chloro-3-norcaryl)ethylene
1,2-dimethyl-1,2-bis(2,5-dimethyl-3-norcaryl)cyclopropane
1,2-bis(2,4,5-trimethyl-3-norcaryl)ethylene
1-(3-methyl-3-cyclohexen-1-yl)-2-(2-ethyl-7-chloro-3-norcaryl)ethylene
1-(2-methyl-3-cyclohexen-1-yl)-2-(3-norcaryl)ethylene The substituted cyclopropanes produced by the method of this invention have utility as chemical intermediates and as additives for varnish compositions. Additionally, the non-halogenated cyclopropane are useful as high energy fuels, and the halogenated cyclopropanes have utility as agricultural chemicals such as insecticides and herbicides.

The following example further illustrates the objects and advantages of this invention, but it should be understood that the various ingredients, reactants, amounts, temperatures, pressures, and other conditions recited in this example should not be construed so as to unduly limit this invention.

*Example*

In a flame-dried 200 ml. 3-necked flask equipped with stirrer, condenser, and gas inlet tube were placed 85 grams (0.45 mol) of trans-1,2-bis(3-cyclohexen-1-yl)ethylene and 17.3 grams (0.23 mol) of sodium methoxide under a nitrogen atmosphere. The mixture was cooled to 5–15° C., and 48.2 grams (0.25 mol) of ethyl trichloroacetate was added all at once. The mixture was stirred for 16 hours at 15–20° C., after which time it had assumed a dark brown color. The mixture was poured into water and extracted with two 100 ml. portions of hexane. The combined hexane extracts were washed once with water and dried over magnesium sulfate. After filtration of the drying agent and evaporation of the solvent, the dark residue was distilled through a 12-in. Vigreaux column, whereby the fractions shown in the following table were obtained.

TABLE

| Fraction | B.P., ° C. | Pressure, mm. Hg | Refractive Index, $n_D^{20}$ | Weight, g. |
| --- | --- | --- | --- | --- |
| 1 | 99–105 | 2.0 | 1.5086 | 51.98 |
| 2 | 110–120 | 1.6 | 1.5090 | 1.34 |
| 3 | 120–145 | 2.0 | 1.5099 | 0.89 |
| 4 | 145–160 | 2.0 | 1.5221 | 1.34 |
| 5 | 160–164 | 2.0 | 1.5303 | 13.2 |
| 6 | 164 | 2.5 | 1.5309 | 2.23 |
| 7 | 164–171 | 2.0 | 1.5312 | 12.9 |

In the above table fraction 1 comprised unreacted triolefin, and fractions 2–4 were mixtures of reaction product and unreacted triolefin. Fractions 5–7 were 1-(3-cyclohexen-1-yl)-2-(7,7-dichloro-3-norcaryl)ethylene ($C_{15}H_{20}Cl_2$), representing a 40 mol percent yield based on the ethyl trichloroacetate charged. The specific gravity of this dichloro compound was 1.115. The nuclear magnetic resonance and infrared spectra of the dichloro compound were consistent with those to be expected for 1-(3-cyclohexen-1-yl)-2-(7,7-dichloro-3-norcaryl)ethylene. Further identification was provided by elemental analysis and molecular weight determination.

Calculated for $C_{15}H_{20}Cl_2$: C, 66.45; H, 7.38; Cl, 26.19; mol. wt., 270.9. Found: C, 66.3; H, 7.4; Cl, 26.5; mol. wt., 263

Obviously many modifications and variations of the present invention are possible in the light of the above teachings. It is therefore to be understood that within the scope of the appended claims the invention may be practiced otherwise than as specifically disclosed herein.

I claim:
1. A novel compound selected from the group of compounds characterized by the following formulas:

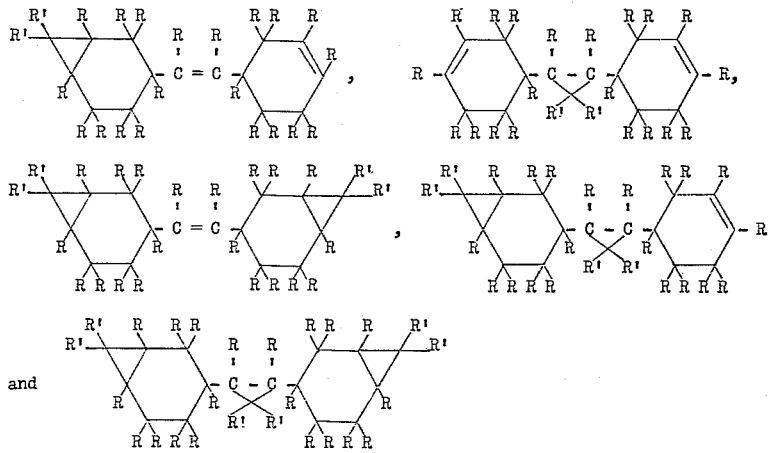

wherein R is selected from the group consisting of hydrogen, methyl and ethyl, the total number of carbon atoms in all of said R groups being not greater than 8, and R' is at least one member selected from the group consisting of fluorine, chlorine, and bromine.

2. A compound as defined in claim 1, 1-(3-cyclohexen-1-yl)-2-(7,7-dichloro-3-norcaryl)ethylene.

3. A compound as defined in claim 1, 1-(3-cyclohexen-1-yl)-2-(7,7-difluoro-3-norcaryl)ethylene.

4. A compound as defined in claim 1, 1,1-dichloro-2,3-bis(7,7-dichloro-3-norcaryl)cyclopropane.

5. A compound as defined in claim 1, 1,1-difluoro-2,3-bis(5,5-diethyl-3-cyclohexen-1-yl)cyclopropane.

References Cited

UNITED STATES PATENTS 3,147,589   9/1964   James _____ 60—35.4

LEON ZITVER, *Primary Examiner.*

M. M. JACOB, *Assistant Examiner.*